(12) United States Patent
Stickles

(10) Patent No.: US 9,452,713 B2
(45) Date of Patent: Sep. 27, 2016

(54) UNIVERSAL LINKAGE MOUNTING BAR

(71) Applicant: Bestop, Inc., Louisville, CO (US)

(72) Inventor: George C. Stickles, Thornton, CO (US)

(73) Assignee: Bestop, Inc., Louisville, CO (US)

(*) Notice: Subject to any disclaimer, the term of this patent is extended or adjusted under 35 U.S.C. 154(b) by 0 days.

(21) Appl. No.: 14/812,618

(22) Filed: Jul. 29, 2015

(65) Prior Publication Data

US 2016/0031376 A1 Feb. 4, 2016

Related U.S. Application Data

(60) Provisional application No. 62/030,414, filed on Jul. 29, 2014.

(51) Int. Cl.
*B60R 3/02* (2006.01)
*B60R 3/00* (2006.01)

(52) U.S. Cl.
CPC ........ *B60R 3/02* (2013.01); *B60R 3/002* (2013.01)

(58) Field of Classification Search
CPC ........... B60R 3/00; B60R 3/002; B60R 3/02; B60R 3/04
USPC ............... 280/163, 164.1, 164.2, 166, 169
See application file for complete search history.

(56) References Cited

U.S. PATENT DOCUMENTS

| | | | | |
|---|---|---|---|---|
| 4,311,320 A | * | 1/1982 | Waters, Jr. | B60R 3/002 108/44 |
| 5,895,064 A | * | 4/1999 | Laubach | B60R 3/002 248/205.1 |
| 8,939,456 B2 | * | 1/2015 | Shelswell | B60R 3/002 280/163 |
| 2003/0006575 A1 | * | 1/2003 | Genis | B60R 3/002 280/163 |
| 2006/0266780 A1 | * | 11/2006 | Armstrong | B60R 11/00 224/545 |

* cited by examiner

*Primary Examiner* — John Walters
(74) *Attorney, Agent, or Firm* — Warn Partners, P.C.

(57) ABSTRACT

A modular mounting system for running board assemblies including at least one universal mounting bar and at least one universal mounting arrangement for connecting to a body panel of a motor vehicle. The universal mounting bar includes at least a first plurality of apertures which correlate to mounting apertures in the vehicle body panel, and a second plurality of apertures which correspond to mounting apertures in a second discreet vehicle body panel, and a third plurality of apertures which correspond to mounting apertures in a third discreet vehicle body panel. The universal mounting bar provides a single bar that accommodates various aperture locations for body panels on any number of predetermined vehicles brands/models. Each universal mounting arrangement has at least one fifth plurality of apertures for connecting to each of a fourth plurality of apertures at predetermined locations on the universal mounting bar.

18 Claims, 5 Drawing Sheets

UNIVERSAL LINKAGE MOUNTING BAR

CROSS-REFERENCE TO RELATED APPLICATIONS

This application claims the benefit of U.S. Provisional Application No. 62/030,414, filed Jul. 29, 2014. The disclosure of the above application is incorporated herein by reference.

FIELD OF THE INVENTION

The present invention relates to an attachment system which provides universal mounting features for attachment of automated and static boards for motor vehicles.

BACKGROUND OF THE INVENTION

Static running boards are generally used for motor vehicles to provide a side step surface into a cab. Automated or "drop down" running boards (ARB) are also commonly used with sport utility vehicles, trucks, and the like having higher ground clearances. ARBs are typically actuated when one or more of the doors of the vehicle are opened by the driver or one of the passengers.

ARB assemblies include additional components compared to non-automated running boards, which are affixed to the vehicle and do not move. Some of these components include one or more mounting plates or bars, brackets, an actuator, such as an electric motor, linkage assemblies, and the like.

One of the problems associated with ARBs is the mounting features are not universal for cross platform use with various vehicle models. Typically, the various components used for attachment of the assembly to the vehicle are specific to that vehicle and/or manufacturer brand and to no other. This results in customization of each attachment feature to accommodate each respective vehicle platform/model. Another common problem is that customization typically requires retooling such as retooling for each mounting requirement in the form of retrofitting or designing new molds or modified stamping dies, etc., which is expensive and time consuming. Further, the various non-universal components used for attachment of the assembly to the vehicle do not provide sufficient support and operability for the automated running board assembly on the various vehicle platforms over the long run and must sometimes be replaced. These are also problems associated with static boards.

A known current power running board design requires specific engineered linkage mounts creating many SKUs (stock of various components) and complex inventory, which increases tooling, piece price, and labor costs, and material handling complexity, space, etc. In addition the automotive industry is introducing aluminum bodies and frames which may require additional mounting points due to the soft aluminum bodies to prevent flex and bind to current power boards.

Typical static or stationary original equipment manufacturer (OEM) sport utility vehicle (SUV) and truck steps utilize 3-4 attachment points to reduce step flex, and suffer from many of the aforementioned problems, e.g., many specific engineered mounts creating many SKUs and complex inventory. Known current power boards utilize only 2 mounting positions, sometimes causing problems associated with deformation of the body panel mounting surface which ultimately flex causing the power board to bind and not operate correctly.

Accordingly, there exists a need for a system for attaching an ARB assembly and a system for attaching a static board assembly to a motor vehicle that is universal/cross platform and which provides sufficient strength, support and operability of the automated power board and of the static board.

SUMMARY OF THE INVENTION

The invention relates to a running board assembly for a motor vehicle. More particularly, in one embodiment an automated running board assembly having a modular mounting system and including a running board movable between a stowed position, a cab entry position, and/or one or more additional predetermined position(s), e.g., side cargo box position. The ARB is actuated when one or more of the doors of the vehicle are opened by the driver or one of the passengers or when actuated by a switch, fob, or the like operated by an operator.

The present invention provides a universal linkage mounting bar that fits a plurality of OEM platforms reducing the complexity and SKUs as well as creating a rigid surface to support running board linkages preventing flex, twist and power board bind. Universal step linkages are operably connectable to the universal mounting bar with universal mounting fasteners. The universal step linkages in combination with the universal linkage mounting bar still further reduces the complexity and SKUs and improving operability, which is a significant benefit over conventional assemblies.

In accordance with another embodiment, there is provided a universal mounting bar and universal mounting fasteners for a static board assembly for a motor vehicle. The universal mounting bar allows the same static board to work with different vehicles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
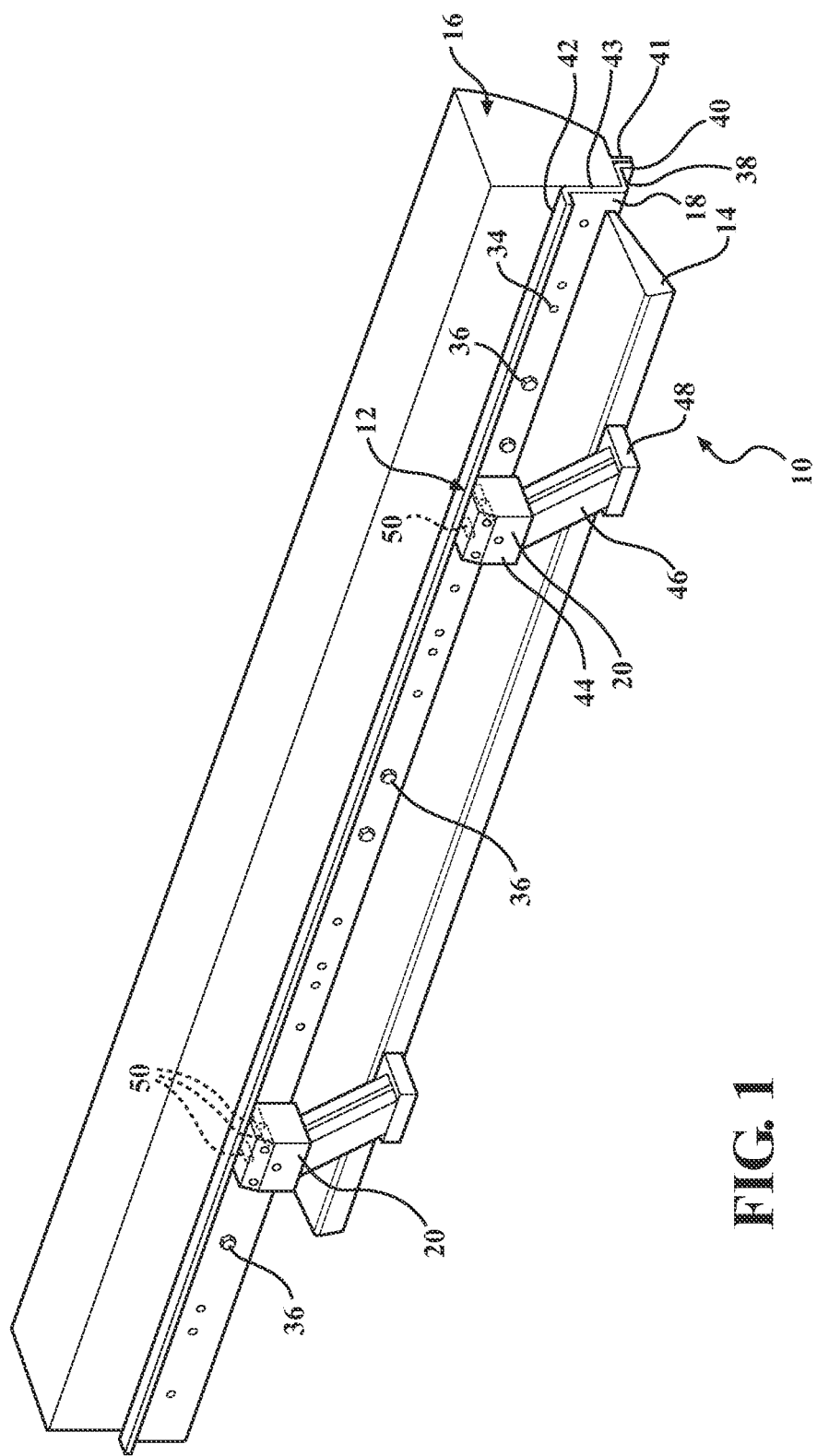
FIG. 1 is a perspective view of an automated running board assembly with universal mounting fasteners shown in phantom attached to an exemplary vehicle body panel according to an embodiment of the present invention.

The following description of the preferred embodiment(s) is merely exemplary in nature and is in no way intended to limit the invention, its application, or uses.

In general, a universal linkage mounting bar according to the present invention is generally linkable to all OEM attachment points depending on the application which adds more structure to current applications as well as provide standard linkage mounting points for a predetermined number of vehicles. The universal linkage mounting bar is designed to be fastenable to any of a multitude of OEM Pickup/SUV stationary side mounting step surfaces. The link, e.g., 4-6 link, automated or power running board universal linkage is then attachable to the universal linkage mounting bar in a standard position. Features of the present invention include the universal linkage mounting bar in combination with the universal step linkage. In accordance with another embodiment, the universal mounting bar for a static board assembly allows the same static board to work with different vehicles.

Referring to FIGS. 1-4 generally, a running board assembly according to a first embodiment of the present invention is shown generally at 10. The running board assembly 10 includes a modular step mounting system shown generally at 12 and a running board 14, which in this embodiment is an automated running board (ARB) assembly. The running board assembly 10 is operably connected to a vehicle panel 16 by at least one universal mounting bar 18 of the mounting system 12 or "universal linkage mounting bar". The step mounting system 12 includes at least one universal mounting arrangement 20 or "universal mounting assembly", which in this embodiment is a universal step linkage, operably connected to the universal mounting bar 18 and running board 14. The running board assembly 10 is movable between at least a stowed position and a deployed position, and the assembly 10 is supported and connected to the vehicle body panel 16 by the mounting system 12 such that the ARB assembly 10 is able to support the weight of passengers as the vehicle is entered and exited. In an alternative embodiment, a universal mounting arrangement is operably connected to the universal mounting bar and to the running board, which is static in this alternative embodiment.

There is one type of universal linkage mounting bar 18 for attachment to any one of a multitude of vehicle body panels 16 for different vehicle models. In this embodiment, the mounting bar 18 is connected to the vehicle body panel 16, e.g., rocker panel, but it is within the scope of the invention that the mounting bar 18 may be connected to the frame of the vehicle or other parts of the vehicle as well.

Figure 2:
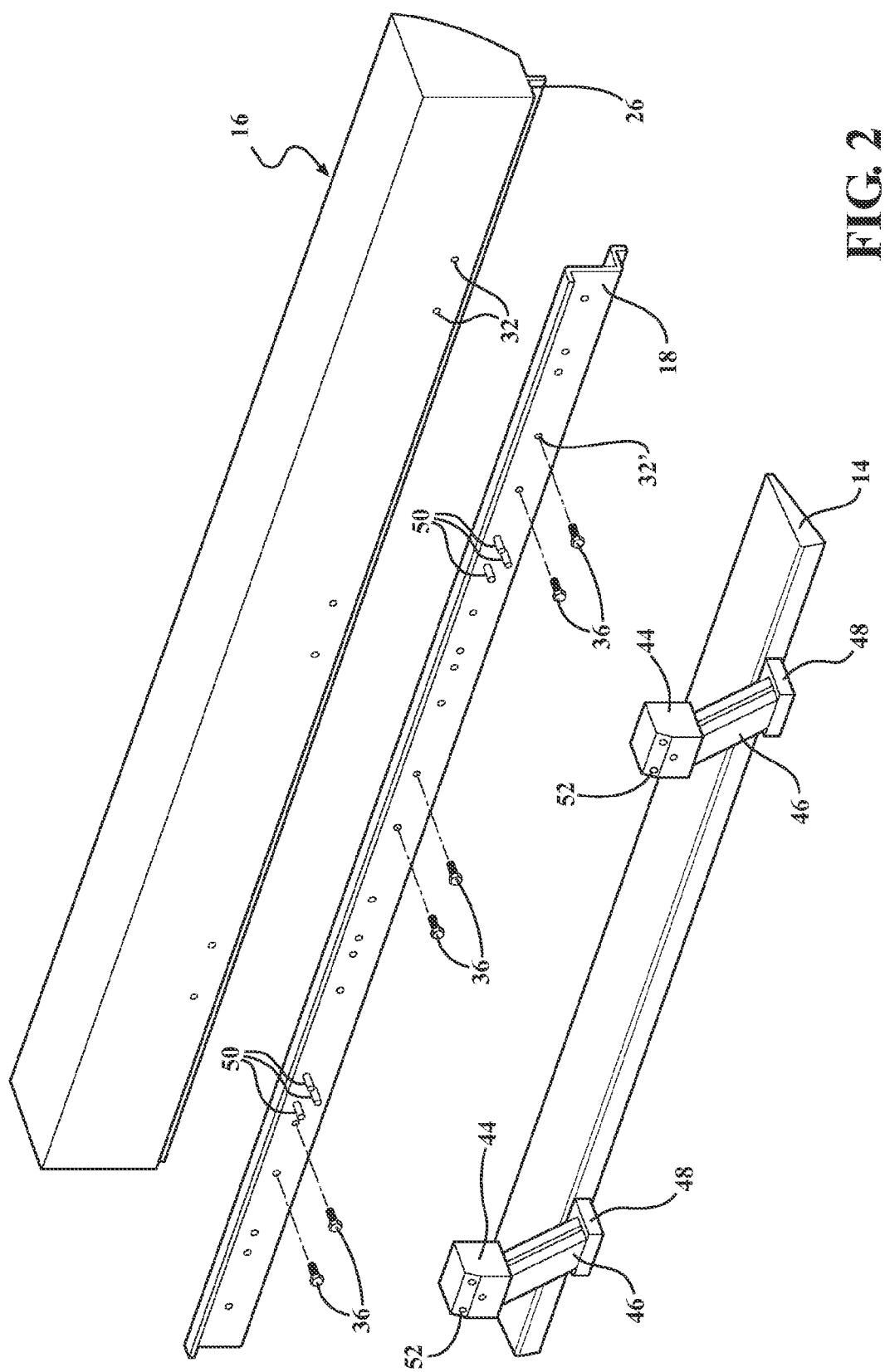
FIG. 2 is an exploded view of FIG. 1 in accordance with the present invention.
Figure 3:
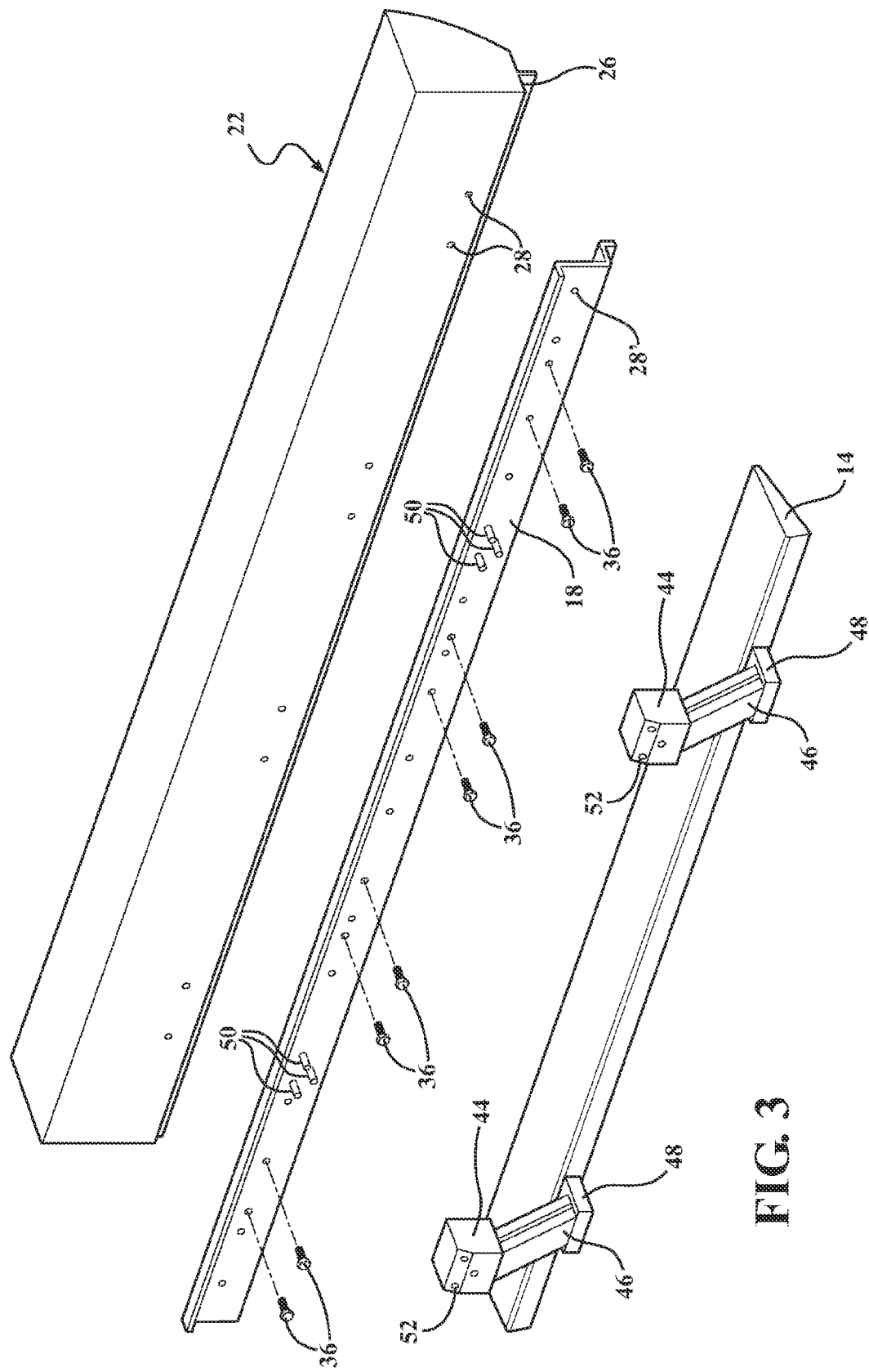
FIG. 3 is an exploded view of the running board assembly connectable to another exemplary vehicle body panel according to the present invention.
Figure 4:
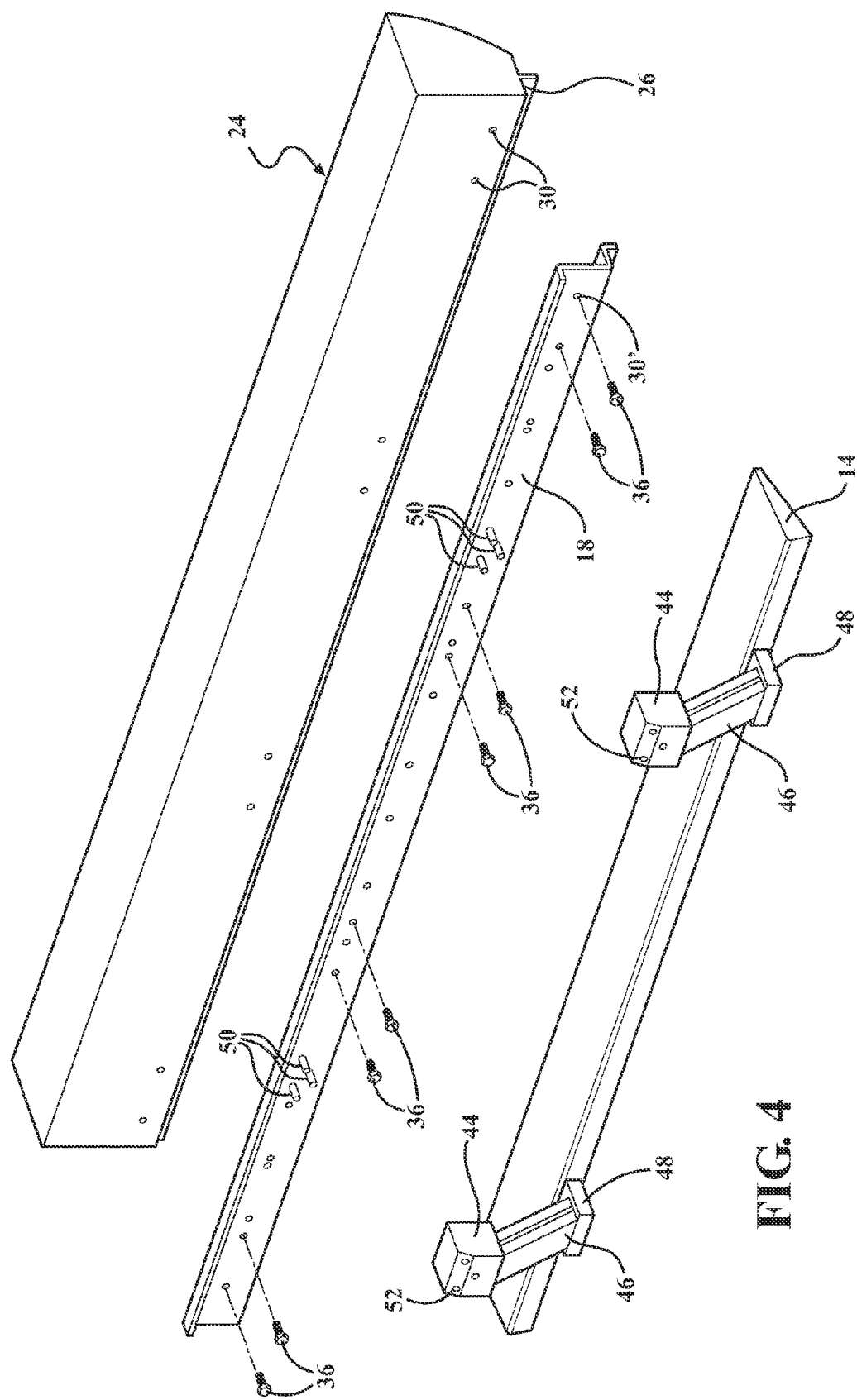
FIG. 4 is an exploded view of the running board assembly connectable to yet another exemplary vehicle body panel according to the present invention.

FIGS. 2-4 illustrate three exemplary distinct vehicle body panels 22,24,16 each with a first mounting surface 26 and each with a plurality of pairs of apertures 28,30,32 or "attachment points", respectively, which may be uniquely spaced such that they are disposed in different locations along each of the respective vehicle body panels 22,24,16 depending on the particular applications. The mounting bar 18 is selectively provided with a plurality of mounting apertures 34 (FIG. 1) at predetermined operable locations to selectively align with the plurality of pairs of apertures 28,30,32. Preferably, at least twenty mounting apertures 34 are provided, however, more or less than twenty mounting apertures 34 may be provided without departing from the scope of the invention.

A first exemplary vehicle body panel 22 (FIG. 3) has four sets of pairs of apertures 28, a second exemplary vehicle body panel 24 (FIG. 4) has four sets of pairs of apertures 24 at different locations than the first 22, and a third vehicle body panel 16 (FIG. 2) has only three sets of pairs of apertures 32 at different locations to the first and second panels 22,24. Thus, by way of example, it is illustrated that each pair of apertures 28,30,32 are positioned at different locations along the vehicle body panels 22,24,16 such that apertures 28,30,32 are not necessarily in the same relative locations. However, each pair of apertures 28,30,32 aligns with respective mounting apertures 34 on the universal mounting bar 18.

The universal mounting bar 18 depicted in the Figures provides a single bar that accommodates these various sets of aperture locations for various body panels. It is appreciated that the amount and/or location of the plurality of pairs of apertures and that the amount of different vehicle body panels and designs can vary depending on the mounting points of a particular vehicle application. However, it is within the scope of the invention that the universal mounting bar 18 can have more or less apertures to align with and accommodate any desired vehicle models.

Referring more particularly to FIG. 3, among the plurality of mounting apertures 34 there are first pairs of mounting apertures 28' that align to the first plurality of pairs of apertures 28 formed on the vehicle body panel 24. Referring more particularly to FIG. 4, among the plurality of mounting apertures 34 there are second pairs of mounting apertures 30' that align to the second plurality of pairs of apertures 30 formed on the vehicle body panel 26. Referring more particularly to FIG. 2, among the plurality of mounting apertures 34 there are third pairs of mounting apertures 32' that align to the third plurality of pairs of apertures 32 formed on the vehicle body panel 16. The predetermined locations of mounting apertures provides exact correspondence with the vehicle body panel apertures for mounting to different vehicle body panels. This is a significant advantage over conventional systems that required different mounting mechanisms, linkage bars and/or linkages for every mounting point provided on the various vehicle models. The universal mounting bar 18 allows mounting directly to what is already there on the vehicle body panels; this eliminates the need to drill or customize attachment points based on different vehicles.

A plurality of first fasteners 36 connect the universal mounting bar 18 to the vehicle body panels 16,22,24 at the aperture locations as explained previously. The fasteners 36 are press in studs, screws or both which are combinable with existing hard point threads in the vehicle body panel 16,22, 24 side. It is appreciated that the fasteners 36 can alternatively be a nut and bolt combination, rivets or any other fasteners suitable for attaching the universal linkage mounting bar 18, and therefore the running board 10, to the vehicle structure.

When installed, a first flange portion 38 of the universal mounting bar 18 is operably in abutting engagement with the first mounting surface 26 of the respective panel 16,22,24. If desired a lower depending portion 40 extending therefrom abuts a lower portion 41 of the panel 16,22,24. An upper flange portion 42 is provided if desired for added strength and securing of the mounting system. A central portion 43 is provided through which the plurality of mounting apertures 34 extend, wherein the first flange portion 38 and central portion 43 form a generally L-shape.

The universal mounting bar 18 is generally a metal stamping. Most preferably, the universal mounting bar 18 is an aluminum extrusion. With the aluminum extrusion holes can be more easily added where needed as the vehicle body panels change in vehicle designs/model years. A CNC (computer numerical control) or other machine suitable for punching holes in new locations as needed is used.

Each universal mounting arrangement 20, which in this embodiment is a universal step linkage, includes a mounting portion 44, at least one link portion 46, and a bracket portion 48. The bracket portion 48 operably connects to the running board 14, e.g., to the outward side surface of the running board using fasteners. The at least one link portion 46 is operably connected to the mounting portion 44 and bracket portion 48. The link portion 46 generally lies at a predetermined angle if desired when in the stowed position such that the running board 14 is at least partially tucked underneath the motor vehicle. By way of non-limiting example, the angled portion 46 has an angle of generally between five and eighty degrees, typically between ten to sixty degrees, preferably between fifteen and forty-five degrees. It is contemplated that two or more links a operably pivotably connected and/or slidably connected to one another forming the link portion 46 and also operably connected to the mounting portion 44 and bracket portion 48. It is further contemplated that the link portion 46 is operably pivotably connected to the mounting portion 44.

A plurality of universal mounting fasteners 50 are provided to operably connect the mounting portion 44 of the universal mounting arrangement 20 to the universal mounting bar 18. In one embodiment, a fourth plurality of apertures, e.g., clusters of three or more, are provided on the universal linkage mounting bar 18 through which the universal mounting fasteners 50 extend. It is understood that more or less than three apertures are contemplated without deviating from the scope of the invention. In a preferred embodiment, the universal mounting fasteners 50 correspond to a fifth plurality of apertures 52 which are preformed in the mounting portion 44 to connect the mounting portion 44 to the universal mounting bar 18. Most preferably, the universal mounting arrangement 20 is attached at the same location(s) along the universal mounting bar 18 regardless of the vehicle body panel model. The universal mounting fasteners 50, which in this embodiment includes pressed in studs going from the inside of the universal mounting bar 18 outward, allow the universal mounting arrangement 20 to slide over the fasteners 50 and then fixed in place, e.g., bolted, or pressed in like a lug nut, and etc. By way of example, press in studs extending from one side of the universal mounting bar outward to engage the mounting portion on at least two universal mounting assemblies and attaching thereto using stationary bolts or lug nuts on the studs.

By way of non-limiting example, at least two universal step linkages 20 are used for extended cab vehicles. In another embodiment a single universal step linkage 20 is used on a regular cab. It is appreciated that one or more universal step linkages 20 and/or one or more universal linkage mounting bars 18 can be used.

There is one running board assembly 10 on each side of the vehicle. Each universal mounting arrangement 20 is substantially mirror images of each other. Movement of the universal mounting arrangement 20 is achieved through use of an actuator assembly operably connected thereto, which causes the universal mounting arrangement 20 to pivot between at least the stowed and deployed positions under predetermined conditions. Preferably, the running board assembly 10 further includes a motor operably coupled to the actuator assembly for driving the first link portion 46 to pivotally move the running board 14 between at least the stowed position and deployed position, e.g., cab entry position, and an electronic control unit operably coupled to the motor and programmed to turn off the motor after a predetermined number of armature revolutions to stop the running board in the deployed position. Alternatively, a switch or key fob initiates movement of the running board 14 to/from the deployed position.

Figure 5:
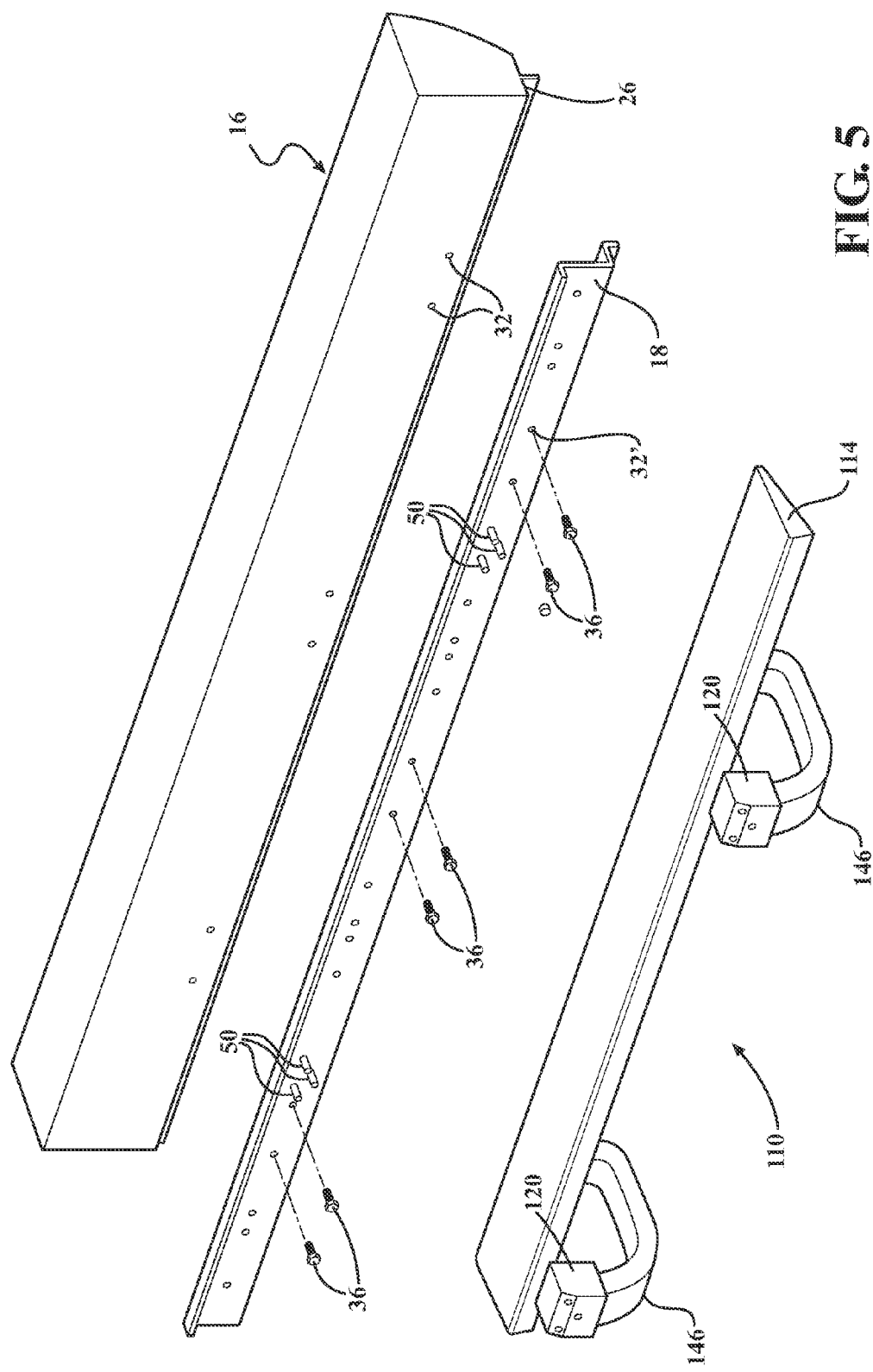
FIG. 5 is an exploded view of a static running board assembly connectable to an exemplary vehicle body panel according to another embodiment of the present invention.

Referring generally to FIG. 5, another embodiment of the present invention is substantially identical to that described above except that the universal mounting arrangement does not deploy. A running board assembly is generally shown at 110, which in this embodiment is a static running board assembly. The running board assembly 110 is operably fastened to a vehicle panel 16 by at least one universal mounting bar 18 with the plurality of first mounting fasteners 36, as described previously. The running board assembly 110 includes at least one running board 114 connected to at least one universal mounting arrangement 120 or "universal mounting assembly", which in this embodiment is a fixed universal step arrangement.

Each universal mounting arrangement 120 includes at least a mounting portion 44 and at least one shaft 146 or other support structure that is fixed in place to hold the running board 114 at a fixed location. The universal mounting arrangement 120 is operably connected to the running board 114 and is operably connected to the universal mounting bar 18 by the plurality of universal mounting fasteners 50, as described previously. Thus, there is provided the universal mounting bar 18 and modular step mounting system for a static running board assembly 110 for a motor vehicle. The universal mounting bar 18 allows the same running board 114 to work with different vehicles. The assembly 110 is supported and connected to the vehicle body panel 16 by the mounting system such that the static assembly 110 is able to support the weight of passengers as the vehicle is entered and exited.

Thus, referring to the Figures generally, there is provided a universal mounting bar in combination with a universal step linkage for ARB assemblies and static board assemblies. The present invention creates a universal mount bar that fits many OEM platforms reducing the complexity and SKUs as well as creating a rigid surface to support both power and static linkages preventing flex, twist and board bind. The universal mounting bar uses and link all OEM attachment points which adds more structure to current applications as well as provide a standard linkage mounting points for all vehicles. The universal mount allows the same automatic running board (ARB) and/or the same static board to work with different vehicles. The universal linkage mounting bar is designed to fasten to many OEM Pickup/SUV stationary side mounting step surfaces. The e.g., 4-6 link, power board universal linkage will then attach to mounting bar in a standard position.

Nerf bars or any other bars and/or running boards or steps are contemplated without deviating from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A running board assembly connected to a motor vehicle, comprising:
at least one universal mounting bar each having a plurality of mounting apertures for use with different vehicles having different vehicle attachment points, said universal mounting bar operably selectively connected to the vehicle;
a plurality of universal mounting fasteners operably connected to the universal mounting bar;
at least one universal mounting assembly each including a mounting portion operably connected to the plurality of universal mounting fasteners, said universal mounting assembly selectively attached to the universal mounting bar in a standard position; and,
a plurality of first fasteners connecting the universal mounting bar to the vehicle by aligning a plurality of pairs of apertures provided on the vehicle as attachment points with the plurality of mounting apertures on the mounting bar and operably connecting the plurality of first fasteners thereto.

2. The running board assembly of claim 1, further comprising a running board operably connected to the universal mounting assembly for providing a stepping surface into/out of the vehicle.

3. The running board assembly of claim 2, wherein the running board assembly is a static running board assembly.

4. The running board assembly of claim 2, wherein the running board assembly is an automated running board assembly deployable between at least a first position for stowage and second position for cab entry.

5. The running board assembly of claim 4, wherein the universal mounting assembly is a universal step linkage.

6. The running board assembly of claim 5, wherein the universal mounting assembly further comprises:
a bracket portion operably connecting the universal mounting assembly to the running board; and
at least one link portion operably connected to the mounting portion and bracket portion, wherein the link portion selectively moves the running board between the first position and second position.

7. The running board assembly of claim 1, further comprising a fifth plurality of apertures on the mounting portion which correlate to the predetermined locations of the plurality of universal mounting fasteners to operably connect the universal mounting assembly to the universal mounting bar.

8. The running board of claim 7, wherein the plurality of universal mounting fasteners are press in studs.

9. The running board of claim 7, wherein the location of the universal mounting fasteners along said universal mounting bar does not vary depending upon the vehicle.

10. The mounting system of claim 1, wherein various pairs of the plurality of mounting apertures each correspond, respectively, to mounting apertures in two or more discreet vehicle body panels of different vehicles.

11. The mounting system of claim 1, wherein there are at least two universal mounting assembly operably connected to the universal mounting bar.

12. The mounting system of claim 1, wherein the universal mounting bar is an aluminum extrusion with the plurality of mounting apertures punched at predetermined locations.

13. A running board assembly mounting system connected to a motor vehicle, comprising:
at least one universal mounting bar each having a plurality of mounting apertures for use with different vehicle parts having different vehicle attachment points, said universal mounting bar operably connected to the desired vehicle with a plurality of first fasteners;
at least one modular step mounting system operably connected to the universal mounting bar with a plurality of universal mounting fasteners in a desired standard position;
a plurality of first fasteners connecting the universal mounting bar to the vehicle by aligning a plurality of pairs of apertures provided on the vehicle part as attachment points with the plurality of mounting apertures on the mounting bar and operably connecting the plurality of first fasteners thereto; and,
a fifth plurality of apertures on the modular step mounting system which correlate to the predetermined locations of the plurality of universal mounting fasteners to operably connect the modular step mounting system to the universal mounting bar.

14. The running board assembly of claim 13, further comprising a running board operably connected to the modular step mounting system for providing a stepping surface into/out of the vehicle.

15. The running board assembly of claim 14, wherein the running board assembly is a static running board assembly or an automated running board assembly deployable between at least a first position for stowage and second position for cab entry.

16. The running board assembly of claim 15, wherein the modular step mounting system further comprises:
a bracket portion operably connecting the modular step mounting system to the running board;
a mounting portion operably connecting the modular step mounting system to the universal mounting bar; and
at least one link portion operably connected to the mounting portion and bracket portion, wherein the link portion selectively moves the running board between the first position and second position.

17. The running board of claim 13, wherein the location of the universal mounting fasteners along the universal mounting bar is the same regardless of the type of vehicle.

18. A mounting system of a running board assembly connected to a motor vehicle, comprising:
at least one universal mounting bar each having a plurality of mounting apertures respectively correlating to a plurality of pairs of apertures on discreet vehicle body panels, said universal mounting bar operably connected to the desired vehicle with a plurality of first fasteners after aligning the mounting apertures to the respective pairs of apertures;
a plurality of universal mounting fasteners operably connected to the universal mounting bar;
at least two universal mounting assemblies each including a fifth plurality of apertures to operably connect the plurality of universal mounting fasteners to said universal mounting assembly in at least one standard position;
a running board operably connected to the universal mounting assemblies for providing a stepping surface; and
wherein the running board assembly is a static running board assembly or an automated running board assembly deployable between at least a first position for stowage and second position for cab entry.

* * * * *